P. E. HUNTER.
WELDING APPARATUS.
APPLICATION FILED AUG. 18, 1916.
1,219,317.
Patented Mar. 13, 1917.
2 SHEETS—SHEET 1.
FIG. 5.
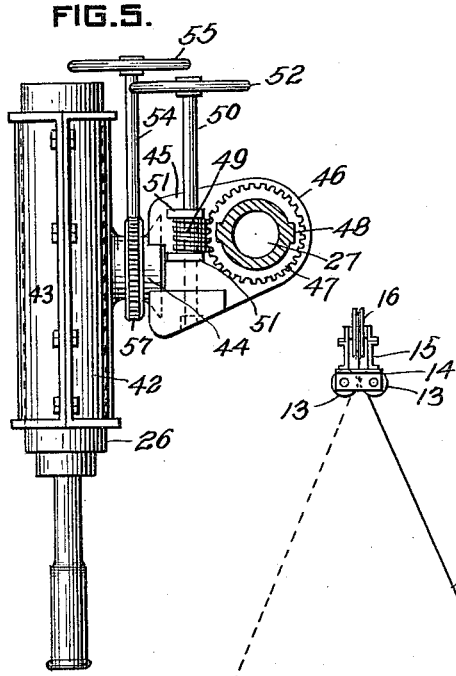
FIG. 6.
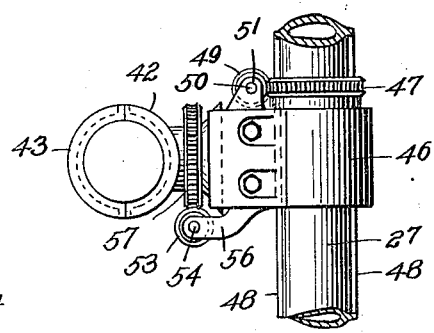
FIG. 1.
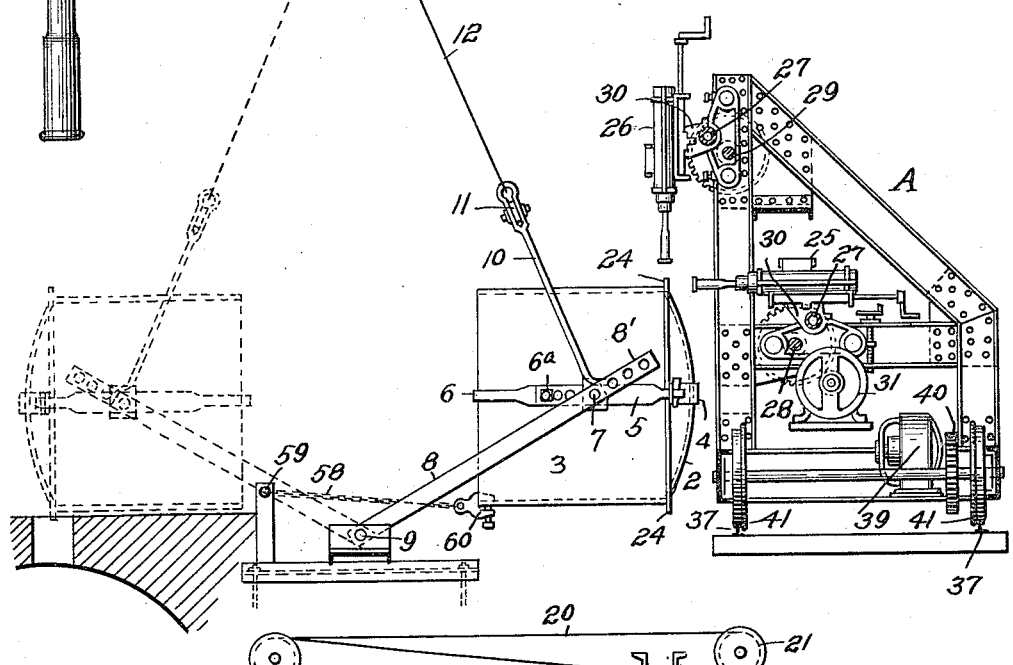
FIG. 2.
WITNESSES
J. Herbert Bradley.
Wal Heckman
INVENTOR
Percy E. Hunter
by C. M. Clarke
Attorney

P. E. HUNTER.
WELDING APPARATUS.
APPLICATION FILED AUG. 18, 1916.

1,219,317.

Patented Mar. 13, 1917.
2 SHEETS—SHEET 2.

WITNESSES

INVENTOR

UNITED STATES PATENT OFFICE.

PERCY E. HUNTER, OF PITTSBURGH, PENNSYLVANIA.

WELDING APPARATUS.

1,219,317.  Specification of Letters Patent.  Patented Mar. 13, 1917.

Application filed August 18, 1916. Serial No. 115,693.

*To all whom it may concern:*

Be it known that I, PERCY E. HUNTER, a citizen of the United States, residing at Pittsburgh, in the county of Allegheny and State of Pennsylvania, have invented certain new and useful Improvements in Welding Apparatus, of which the following is a specification.

My invention has in view to provide a simple and convenient means for manipulating articles to be flanged, forged or welded, and comprises, in combination with a flanging, welding or forging apparatus, and a heater, means for positively locating the article to be acted upon in heating and flanging, forging or welding position.

More particularly, the apparatus comprises a tilting framework adapted to pivotally engage and support the article-holding frame and to shift it from one position to another by means of lifting and lowering mechanism acting in conjunction with a tilting frame which supports and throws the article over or under its pivotal mounting from one side to the other, together with a suitable flanging, welding or forging tool, and preferably a plurality thereof, mounted upon a supporting frame, preferably a traveling carriage, adapted to be moved from one point of operation to another to act upon a series of articles, the flanging, forging or welding tools being so mounted as to be individually adjustable upon said carriage.

One preferred embodiment of the invention is shown in the accompanying drawings, in which—

Figure 1 shows the apparatus in end elevation, the article being treated being indicated in dotted lines in the heating position and in full lines in the operative position in relation to the welding machine.

Fig. 2 is a detail view showing means for throwing the supporting framework beyond the dead center.

Fig. 5 is an enlarged sectional detail view in elevation of one of the flanging tools, showing it mounted for angular adjustment.

Fig. 6 is a plan view of Fig. 5.

Figure 3:
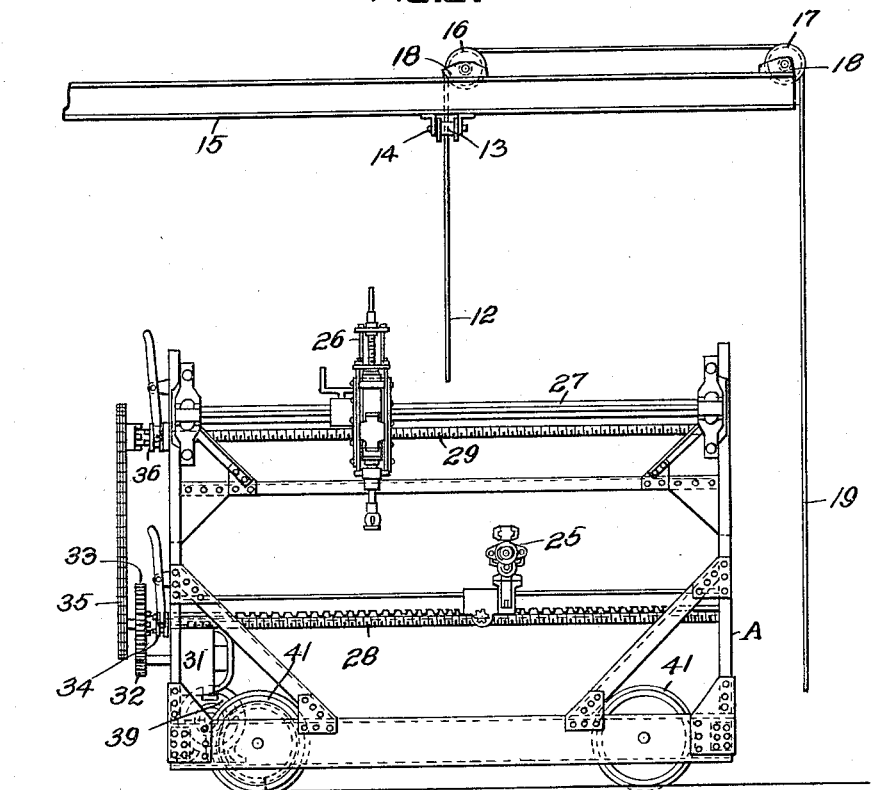
Fig. 3 is a face view in elevation of the flanging, forging or welding machine.
Figure 4:
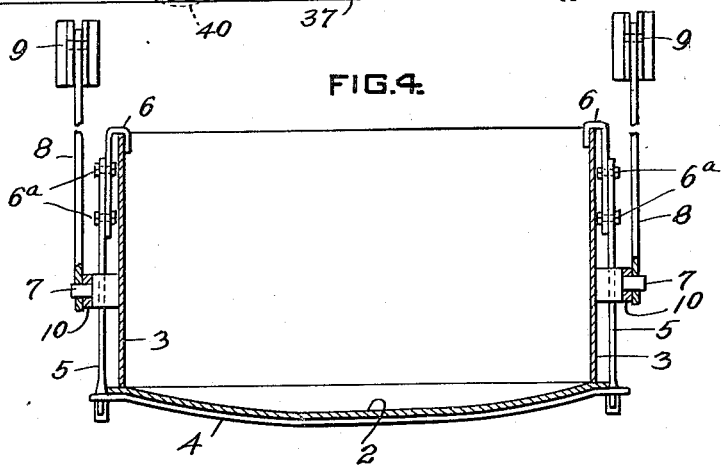
Fig. 4 is an enlarged sectional detail view of one of the articles being operated upon, as an annealing box, and showing portions of the supporting and tilting mechanism.

In holding the top 2 of an annealing box in position for attachment to the side portion 3, I provide an embracing yoke or clamp 4 and side bars 5, 5, secured to the ends of the yoke 4 by key attachment or otherwise, and engaging the other edges of the box by hooks 6, preferably adjustably secured to bars 5 by bolts 6ª and a plurality of holes. The box is thus clamped at its middle portion, whereby to fixedly hold the parts together during the flanging, heating and welding operations.

Extending laterally from the yoke framing at each end or side (it being understood that individual yokes are provided for both lengthwise and crosswise engagement) are trunnion bearing gudgeons or pins 7, 7, located at or about the normal center of gravity of the box to be manipulated.

Tilting supporting arms 8, 8, pivotally mounted at 9 to suitable foundation supports engage the trunnions 7 by their upper terminals and are adapted to swing the box over from the heating position at the left side of Fig. 1 to the welding position at the right side.

For the purpose of so swinging the supporting arms and the box being acted upon, link arms 10 engage the trunnions 7 at their lower ends and are connected at their upper ends by a cross bar 11 which is connected at its middle portion to cable 12.

Said cable engages against one or the other of guiding sheave wheels 13, 13, mounted in a supporting bracket 14 depending from a superimposed framework 15 which may conveniently be made of channel sections.

Cable 12 passes over one or more guiding sheave wheels 16, 17, mounted in suitable supporting brackets 18 on framework 15, and is so located by a terminal portion 19 within reach of manual or mechanical manipulation as to effect the lifting and lateral shifting and lowering of the box by merely raising and lowering the cable, as will be readily understood.

If desired, however, cable 12 may be connected directly to any suitable actuating mechanism as a winding drum or the lifting element of an electric or other crane.

In order to insure positive tilting of the article beyond the dead center position, should the momentum at any time fail to carry it over, the framework 15 may be suitably mounted upon sliding or rolling bearings for lateral shifting, and provided with flexible connections as cables 20, 20, passing around suitable guiding sheaves 21, 22, respectively, and depending by a looped portion 23, as clearly shown in Fig. 2. By this means a limited range of shifting movement may be imparted to framework 15 in either direction to overcome any such contingency.

The box may be manually manipulated to reverse its position, but to insure its swinging around to the position for operation, as at the right side of Fig. 1, I employ a stop device as a chain 58 connected at 59 to a limiting stop and secured by its other end and clamp 60 to the edge of the box. As the box is thrown over, it will thus automatically be rotated on its trunnions to reversed position, bringing the heated flange into operative position with relation to the tools.

The top or cover 2 of box 3 extends laterally beyond its top side portion, as indicated at 24, and for the purpose of flanging, forging or welding over the said portion, when heated, I provide the welding tool or tools 25, 26, respectively.

These are of well-known construction, either air or electrically driven, or otherwise, as may be desired, and adapted to deliver a series of hammer blows against the projecting flange portion 24 to bend it over and weld it upon the side portion 3 of the box.

In using two such welding units, machine 25 is first used to bend the flange part-way, after which machine 26 completes the operation. Each machine is slidably mounted longitudinally on a supporting carriage A by means of a suitable guide bar 27, and the carriage is provided with threaded shafts 28, 29, one for each welding machine, and which engages the slidably mounted carrying base or support 30 thereof.

For the purpose of actuating each welding machine separately longitudinally of the carriage A, I provide a motor 31 geared by driving pinion 32 and gear wheel 33 with threaded shaft 28 of welding machine 25, an intervening clutch device 34 being preferably provided for throwing the mechanism into and out of gear.

Sprocket and chain gearing 35 transmits movement from said driving mechanism through similar clutch mechanism 36 to shaft 29 of welding machine 26, and by this means it will be seen that each machine may be moved independently along the carriage whereby to act upon the entire length of the part being welded. The motor may be reversed for reverse movement of either machine. It will also be understood that each machine may be moved along by hand, if preferred.

Carriage A is mounted upon suitable supporting tracks 37 running parallel with a series of furnace openings 38, it being understood that a series of the box manipulating frames is located in alinement, so as to provide for the heating of several of the boxes and the manipulation of one after another successively from the heating position to the welding position.

After each welding operation the carriage is shifted along to the next working position, by means of a motor 39 and gearing 40 adapted to transmit traction to the wheels 41 of the carriage, as will be readily understood, or the carriage may be shifted by any other means.

If desired, either tool 25 or 26 may be so mounted as to be adjusted to any suitable angle around its supporting shaft 27 and actuated thereon by means such as shown in Figs. 5 and 6.

In such case, the tool, as 26, is clamped between housings 42, 43, by bolts or otherwise, and is rotatably mounted by housing extension 44 against a retaining portion of base 45.

Said base in turn is rotatably mounted around shaft 27 by its embracing collar 46. A worm wheel 47 is fixed on shaft 27 by keys 48 or otherwise and a worm 49 of shaft 50 engages worm wheel 47. Shaft 50 is mounted in bearings 51 and has a hand wheel 52 by which the base 45 may be turned in either direction, carrying with it housing 42 and the tool 26 to the desired angle.

Similarly the housing and tool are adjusted at right angles to the plane of such adjustment by means of worm 53 on shaft 54 having hand wheel 55 and mounted in bearings 56. Worm 53 engages worm wheel 57 secured upon housing extension 44, by which means the housing and tool may be adjusted to the desired angle. These adjustments provide for locating the hammer terminal of the tool at any angle to suit the work.

After each box is welded along one edge portion, the clamp is loosened and the box is reversed in position within the embracing framework, whereby to bring the opposite side flange 24 into heating and welding position respectively, when the operation above described is repeated.

In case the box is longer than it is wide, which is the usual condition, a separate clamping yoke is then used but of the same kind, embracing the box crosswise at right angles to the position of the first clamp used, thereby leaving the end flange portions exposed. The box is then again heated and welded, preferably at another location, and in combination with a separate welding machine set to suitable corresponding positions as to increased height, due to the changed conditions.

However, the same welding units may be used, if desired, where the variation is not too great by providing for vertical adjustment of the machines and by using the same tilting arms 8 having a perforated extension 8', whereby to provide for supplemental pivotal mounting for the trunnions.

Various other changes or modifications may be made by the skilled mechanic in the design, proportions, size, or other details, within the scope of the appended claims.

What I claim is:

1. In a welding apparatus of the class described, in combination with heating and welding mechanism, means for supporting and moving an article to be welded from heating to welding position embodying a pair of pivoted arms and a clamp pivoted between them.

2. In a welding apparatus of the class described, in combination with heating and welding mechanism, means for supporting and moving an article to be welded from heating to welding position, comprising a pivoted framework carrying a pivotally mounted clamp located between the heating and welding position, and means for actuating said framework.

3. In a welding apparatus of the class described, in combination with heating and welding mechanism, means for supporting and moving an article to be welded from heating to welding position, comprising a pivoted framework carrying a pivotally mounted clamp located between the heating and welding position, and means for actuating said framework and for positively throwing it from one side to the other.

4. In a welding apparatus of the class described, in combination with heating and welding mechanism, means for supporting and moving an article to be welded from heating to welding position, and for reversing it in position in its movement from one position to another.

5. In combination with a welding machine at one side and a heating furnace at the other side, an intervening article-supporting mechanism having a pivotally mounted clamp adapted to pivotally support an article, and means for swinging said mechanism and article.

6. In combination with a welding machine at one side and a heating furnace at the other side, a pair of pivotally mounted arms, and an article-supporting clamp trunnioned on said arms.

7. In combination with a welding machine at one side and a heating furnace at the other side, a pair of pivotally mounted arms, an article-supporting clamp trunnioned on said arms, and means for swinging the arms and clamp from one position to the other.

8. In combination with a welding machine at one side and a heating furnace at the other side, a pair of pivotally mounted arms, an article-supporting clamp trunnioned on said arms, and means adapted to arrest and pivotally turn an article carried thereby.

9. In combination, a pair of pivoted arms, an article-holding frame pivoted to said arms, and means engaging the pivotal mounting of the frame for swinging the arms, frame and article from one side to the other.

10. In combination, a pair of pivoted arms, an article-holding frame pivoted to said arms, means engaging the pivotal mounting of the frame for swinging the arms, frame and article from one side to the other, and means adapted to engage the article and turn it and the frame on the pivotal mounting of the frame.

11. In combination, a pair of pivoted arms, an article-holding frame pivoted to said arms, means engaging the pivotal mounting of the frame for swinging the arms, frame and article from one side to the other, and a chain fixedly connected at one end having a clamp at the other end for attachment to the article to limit its movement in turning.

12. In combination with a box supporting and swinging clamp, and a pair of pivotally connected supporting arms therefor, a movable frame having an independently adjustable operating tool adapted to be located in operative position with relation to a box carried by the clamp.

13. In combination with a box supporting and swinging clamp, and a pair of pivotally connected supporting arms therefor, a movable frame having an independently adjustable operating tool adapted to be located in operative position with relation to a box carried by the clamp, and a carriage for said frame.

14. In combination with a pair of pivotally mounted arms, a box clamp pivoted thereto, and means for swinging the arms and clamp and a box carried thereby; a carriage provided with a frame movable with relation to the article carried by said clamp and provided with an independently adjustable tool adapted to be set in operative relation to the article.

15. In combination with a pair of pivotally mounted arms, a box clamp pivoted thereto, and means for swinging the arms and clamp and a box carried thereby; a carriage provided with a frame movable with relation to the article carried by said clamp and provided with a plurality of individually and independently adjustable tools, each adapted to be set in operative relation to the article.

In testimony whereof I hereunto affix my signature in the presence of two witnesses.

PERCY E. HUNTER.

Witnesses:
W. A. HECKMAN,
C. M. CLARKE.

Copies of this patent may be obtained for five cents each, by addressing the "Commissioner of Patents, Washington, D. C."